United States Patent
Srivastava et al.

(10) Patent No.: US 10,630,903 B2
(45) Date of Patent: Apr. 21, 2020

(54) SYSTEMS AND METHODS FOR IMAGE EXPOSURE

(71) Applicant: QUALCOMM Incorporated, San Diego, CA (US)

(72) Inventors: Nitin Srivastava, Hyderabad (IN); Lucky Bagaria, Hyderabad (IN); Yashwant Deepak Sonawane, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/870,689

(22) Filed: Jan. 12, 2018

(65) Prior Publication Data

US 2019/0222769 A1 Jul. 18, 2019

(51) Int. Cl.
| | | |
|---|---|---|
| *H04N 5/235* | (2006.01) | |
| *H04N 5/232* | (2006.01) | |
| *H04N 5/225* | (2006.01) | |
| *G06F 3/048* | (2013.01) | |
| *H04N 5/355* | (2011.01) | |

(52) U.S. Cl.
CPC ......... *H04N 5/23293* (2013.01); *G06F 3/048* (2013.01); *H04N 5/2253* (2013.01); *H04N 5/2353* (2013.01); *H04N 5/2355* (2013.01); *H04N 5/2356* (2013.01); *H04N 5/23219* (2013.01); *H04N 5/23229* (2013.01); *H04N 5/35554* (2013.01)

(58) Field of Classification Search
CPC ........................... H04N 5/2355; H04N 5/2356
USPC ...................................................... 348/221.1
See application file for complete search history.

(56) References Cited

U.S. PATENT DOCUMENTS

| | | | |
|---|---|---|---|
| 8,699,822 B2 | 4/2014 | Park et al. | |
| 9,058,655 B2 | 6/2015 | Doepke et al. | |
| 9,467,607 B2 | 10/2016 | Ng et al. | |
| 9,704,250 B1 | 7/2017 | Shah et al. | |
| 2006/0007346 A1* | 1/2006 | Nakamura ........... | H04N 5/2354 348/362 |
| 2009/0060379 A1* | 3/2009 | Manabe ............. | H04N 5/23219 382/274 |
| 2011/0292242 A1* | 12/2011 | Imai ................... | H04N 5/23216 348/229.1 |
| 2012/0105579 A1* | 5/2012 | Jeon ..................... | H04N 5/2258 348/38 |
| 2012/0314124 A1* | 12/2012 | Kaizu ................. | H04N 5/2353 348/362 |

(Continued)

FOREIGN PATENT DOCUMENTS

JP 2006311311 A * 11/2006 ............. H04N 9/643

*Primary Examiner* — Anthony J Daniels
(74) *Attorney, Agent, or Firm* — Paradice & Li LLP

(57) ABSTRACT

Aspects of the present disclosure relate to systems and methods for generating High-Dynamic Range (HDR) images. An example device may include one or more processors and a memory. The memory may include instructions that, when executed by the one or more processors, cause the device to identify a number of regions of interest (ROIs) in a preview image, wherein the number of ROIs is more than one, determine a number of images to be captured for an HDR image to be the number of identified ROIs, and for each ROI associated with a respective image of the number of images to be captured, determine an exposure value to be used in capturing the respective image of the number of images.

16 Claims, 8 Drawing Sheets

(56) References Cited

U.S. PATENT DOCUMENTS

2015/0288870 A1\* 10/2015 Nagaraja .............. H04N 5/2356
                                                            348/333.02
2016/0352996 A1\* 12/2016 Qian ....................... G06T 5/007
2017/0118394 A1     4/2017 Van Hoeckel et al.
2017/0187938 A1\*  6/2017 Ichihara ............... H04N 5/2351
2017/0372108 A1\* 12/2017 Corcoran ........... G06K 9/00228
2018/0288311 A1\* 10/2018 Baghert ............. H04N 5/23219

\* cited by examiner

800

Measure the brightness for the ROI in the preview image. 802

Disregard portions of the ROI not including the face when measuring the brightness. 804

Determine a skin tone from the measured brightness for the ROI. 806

Compensate for scene lighting in determining a skin tone. 808

Determine an interpolation factor. 810

Determine a target brightness for the determined skin tone. 812

Use the determined interpolation factor to determine the target brightness. 814

FIG. 8

SYSTEMS AND METHODS FOR IMAGE EXPOSURE

TECHNICAL FIELD

This disclosure relates generally to systems for image capture devices, and specifically to determining exposures based on multiple regions of interest for high-dynamic range imaging.

BACKGROUND OF RELATED ART

Devices including or coupled to one or more digital cameras use a camera sensor to capture light information for generating digital images. Camera sensors for digital cameras typically capture a limited range of brightness or light intensity when capturing an image frame of a scene. A conventional image captured with a limited or standard range of brightness is called a limited-dynamic range (LDR) image or a standard-dynamic range (SDR) image.

Many devices capture an LDR or SDR image using an automatically determined exposure value (e.g., an auto-exposure (AE) setting) and an undesirably limited range of brightness captured for the captured image. For example, although a person is able to perceive a large range of brightness and light effects of a scene (such as shadows and color contrasts), a captured LDR or SDR image may appear muted or dull because of its limited range of brightness. To compensate for the limited range of brightness associated with such captured images, many digital cameras perform high-dynamic range (HDR) imaging for capturing images.

For HDR imaging, multiple LDR or SDR images are captured with different exposure values, and the captured images are blended to create an HDR image that includes capture information for a larger range of exposures than an LDR or SDR image. The exposure values for the LDR images may be influenced by a user input or aspects of the image, but the exposure values are still limited by conventional HDR imaging such that the number of images to be captured and the exposure values used in capturing the number of images may not be optimal for the HDR image to be created.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure relate to systems and methods for generating high-dynamic range (HDR) images. In some example implementations, a device may include one or more processors and a memory. The memory may include instructions that, when executed by the one or more processors, cause the device to identify a number of regions of interest (ROIs) in a preview image, wherein the number of ROIs is more than one, determine a number of images to be captured for an HDR image to be the number of identified ROIs, and for each ROI associated with a respective image of the number of images to be captured, determine an exposure value to be used in capturing the respective image of the number of images.

In another example, a method is disclosed. The example method includes identifying a number of regions of interest (ROIs) in a preview image, wherein the number of ROIs is more than one, determining a number of images to be captured for an HDR image to be the number of identified ROIs, and for each ROI associated with a respective image of the number of images to be captured, determining an exposure value to be used in capturing the respective image of the number of images.

In a further example, a non-transitory computer-readable medium is disclosed. The non-transitory computer-readable medium may store instructions that, when executed by a processor, cause a device to perform operations including identifying a number of regions of interest (ROIs) in a preview image, wherein the number of ROIs is more than one, determining a number of images to be captured for an HDR image to be the number of identified ROIs, and for each ROI associated with a respective image of the number of images to be captured, determining an exposure value to be used in capturing the respective image of the number of images.

In another example, a device is disclosed. The device includes means for identifying a number of regions of interest (ROIs) in a preview image, wherein the number of ROIs is more than one, means for determining a number of images to be captured for an HDR image to be the number of identified ROIs, and means for determining, for each ROI associated with a respective image of the number of images to be captured, an exposure value to be used in capturing the respective image of the number of images.

BRIEF DESCRIPTION OF THE DRAWINGS

Aspects of the present disclosure are illustrated by way of example, and not by way of limitation, in the figures of the accompanying drawings and in which like reference numerals refer to similar elements.

FIG. 8 is an illustrative flow chart depicting an example operation for determining a target brightness for a ROI based on skin tone.

DETAILED DESCRIPTION

Figure 1:
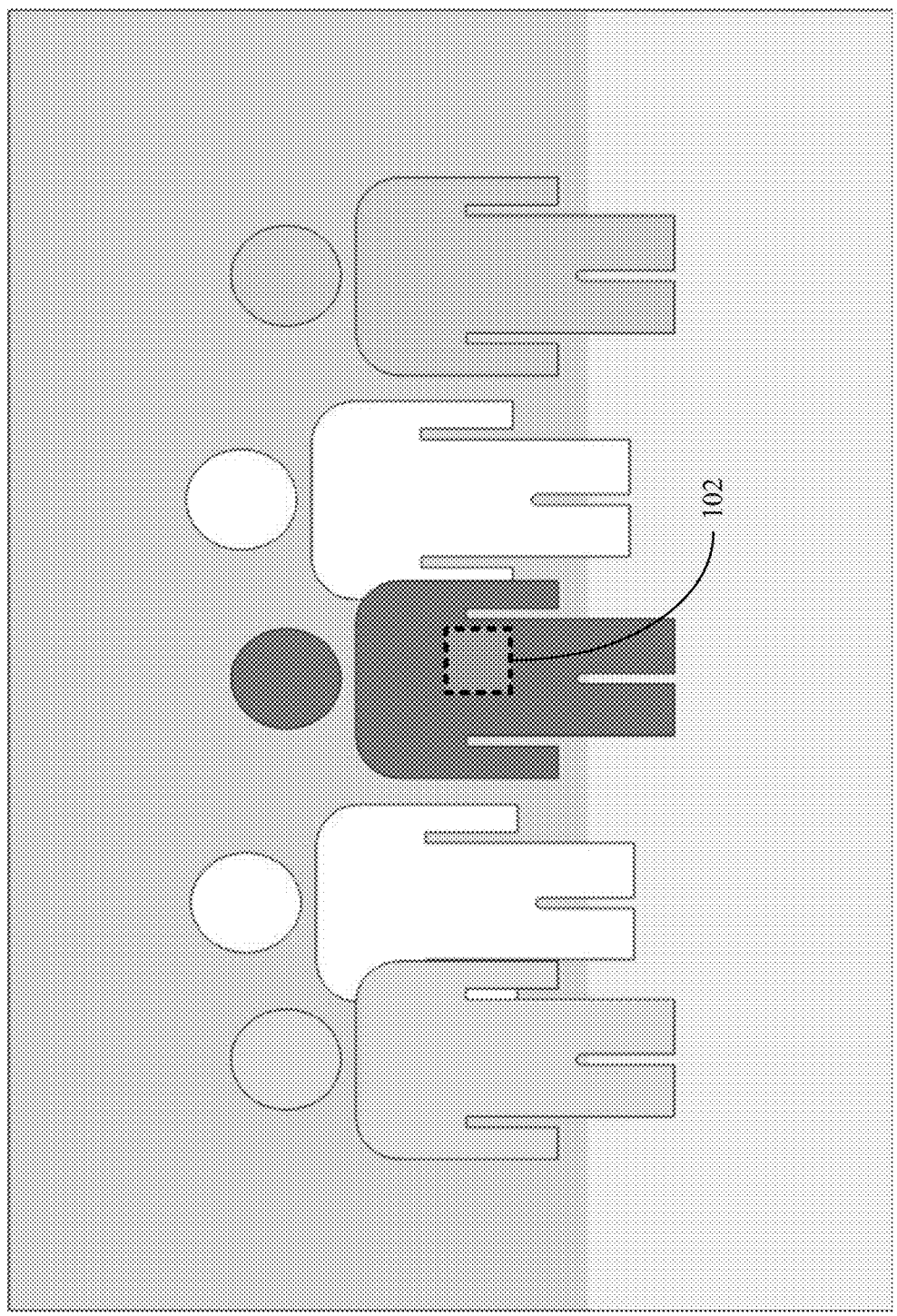
FIG. 1 illustrates a depiction of an example preview image with a region of interest (ROI) based on a center portion of the camera sensor.

Aspects of the present disclosure may be used for generating HDR images. In some implementations, a device may capture multiple LDR or SDR images having different exposures (and thus different ranges of brightness), and then combine (e.g., blend, mix, and/or merge) at least some portions of the multiple images to generate an HDR image. By combining the multiple images having different exposures and ranges of brightness, the resulting HDR image may have a larger range of brightness than conventional LDR or SDR images. In the following description, a single image captured using a camera sensor's standard or limited range of brightness is referred to as a LDR image. However, the term "LDR image" is for explanation purposes and is not intended to limit aspects of the disclosure. For example, a LDR image may be any image having a range of brightness that is less than the range of brightness for an associated HDR image. The term "image" may refer to an "SDR image," "LDR image," "HDR image," or other type of image, unless expressly stated otherwise. Further, while the term "image" is used in the following examples, example implementations may also apply to a plurality of images, such as video. In this manner, the term "preview image" may refer to an image or a succession of images (such as a video) for previewing a scene, and the term "HDR image" may refer to an image or a succession of images (such as a video) generated through HDR imaging.

A digital camera sensor typically captures a limited range of brightness for a LDR image. To capture different ranges of brightness for multiple LDR images, a digital camera sensor may capture the multiple LDR images using different exposure values. Exposure values (EV) may be expressed in terms of f-values or stops, and may be measured as an amount of brightness for a unit of area (such as in units of candelas per square feet ($cd/ft^2$) or candelas per square meter ($cd/m^2$)). One stop above or more refers to a doubling of the amount of light received by a camera sensor (such as $2*x$ $cd/ft^2$), and one stop below or less refers to a halving of the amount of light received by the camera sensor (such as $x/2$ $cd/ft^2$). A device may adjust an exposure value (and thus the amount of light measured by a camera sensor) by adjusting the camera shutter speed, adjusting the camera sensor sensitivity (e.g., measured in ISO), and/or adjusting the camera aperture size.

Many devices automatically determine an exposure value for capturing a LDR image (such as an auto-exposure (AE) setting). The AE setting may be used to adjust camera settings so that an image to be captured will have a target brightness. For example, when a camera sensor is activated, information from the camera sensor may be used to generate a preview stream including a plurality of preview images. Measurements from the preview stream (such as color contrast, measured brightness, and so on) may be used by the device to determine initial settings for capturing an image. The preview stream may also be displayed to assist a user in positioning the device or changing one or more of the camera settings. In some aspects, a default exposure value (such as a default stop) may be set so that the device captures a LDR image with an overall target brightness. The device may recursively measure the brightness of a preview image and adjust the exposure value (by adjusting one or more camera settings) until the measured brightness of the preview image equals the target brightness for the LDR image to be captured. For example, a simple average of the pixel brightness for each pixel of the preview image may be used in determining the exposure value. The preview image may also be displayed to assist a user in positioning a camera and/or adjusting one or more camera settings. For example, many devices allow a user to set an exposure value for capturing a LDR image (such as by selecting a stop).

Brightness may be any measure of light intensity received by a camera sensor. For example, brightness may be expressed in terms of a luma or luminance. A luminance for an image may be measured in candelas per square meter ($cd/m^2$), nits, stilbs, or other suitable units indicative of a level of brightness. Although the examples described herein use the term brightness for illustrative purposes, aspects of the present disclosure may use any measurement of brightness or light intensity for an image.

A device (e.g., a camera) may use a region of interest (ROI) in a preview in determining an exposure value for an image to be captured. For example, a ROI in a preview image may be determined, and the measured brightness within the ROI may be used to skew the overall measured brightness of the preview image in order to determine an exposure value. In this manner, the device may rely more on the measured brightness in the ROI than the measured brightness outside of the ROI in the preview image when determining the exposure value. For example, the device may perform a weighted average of brightness across the pixels of a preview image (with the weight applied to the measured pixel brightness in the ROI being greater than the weight applied to the measured pixel brightness outside the ROI) instead of a simple average in order to determine an exposure value for capture.

FIG. 1 illustrates a depiction of an example preview image 100. As previously stated, alternative to an exposure value for capturing an image being based on a simple average of all measured brightness in the preview image, the exposure value may be biased or skewed by a ROI. Some devices may use a predetermined or predefined area or portion (e.g., the center portion) of a camera sensor for the ROI. For example, when measuring the brightness of the preview image 100, the measured pixel brightness determined or sensed by the portion of the camera sensor corresponding to ROI 102 of the preview image 100 may be given a greater weight than the measured brightness determined by the portion of the camera sensor corresponding to the preview image 100 outside ROI 102. The assumption may be that a user capturing the image would intend for the preview image to be centered on the object of interest. In this manner, a user may orient a camera so as to place the object of interest in the center portion of the preview. Some devices may provide a crosshair or target at the center of the preview image to indicate such a ROI.

Figure 2:
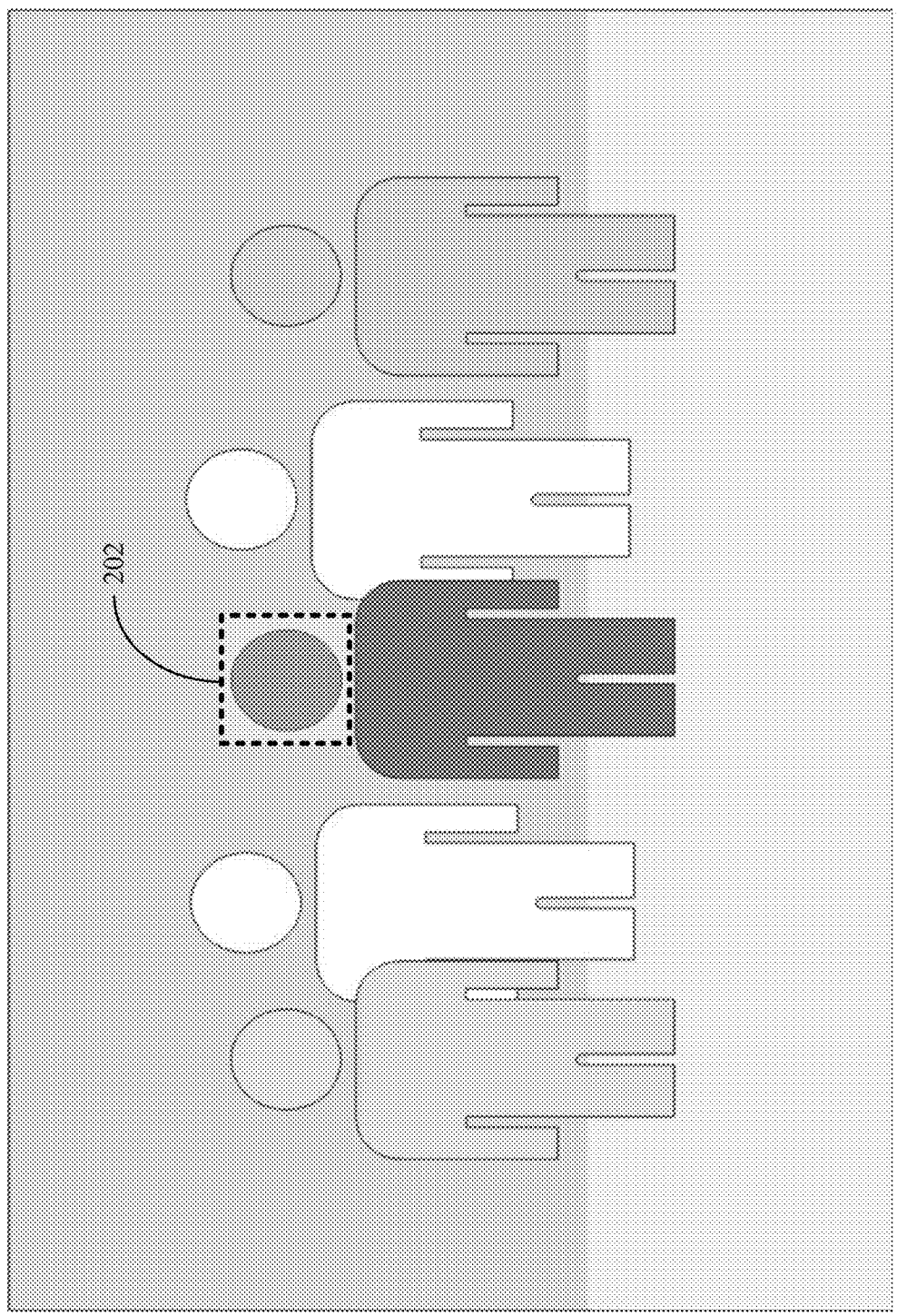
FIG. 2 illustrates the depiction of the example preview image in FIG. 1 with a region of interest (ROI) based on a person's face.

FIG. 2 illustrates another depiction of the example preview image 100 with a ROI 202 based on facial recognition. A user may prefer an image of a person to be captured using an exposure value so that the features of a person's face can be seen in the image. As a result, devices may include facial recognition technology so that a face may be identified in a preview image, and the devices may create a ROI for the identified face. In one example, a device may use facial recognition to identify a face closest to the center of the preview image to generate a ROI (such as a determined center pixel or closest boundary pixel of ROI 202 being the least number of pixels away from the center of preview image 100). In another example, a device may use facial recognition to identify multiple faces and select the face among the multiple faces with the measured brightness closest to the target brightness.

Figure 3:
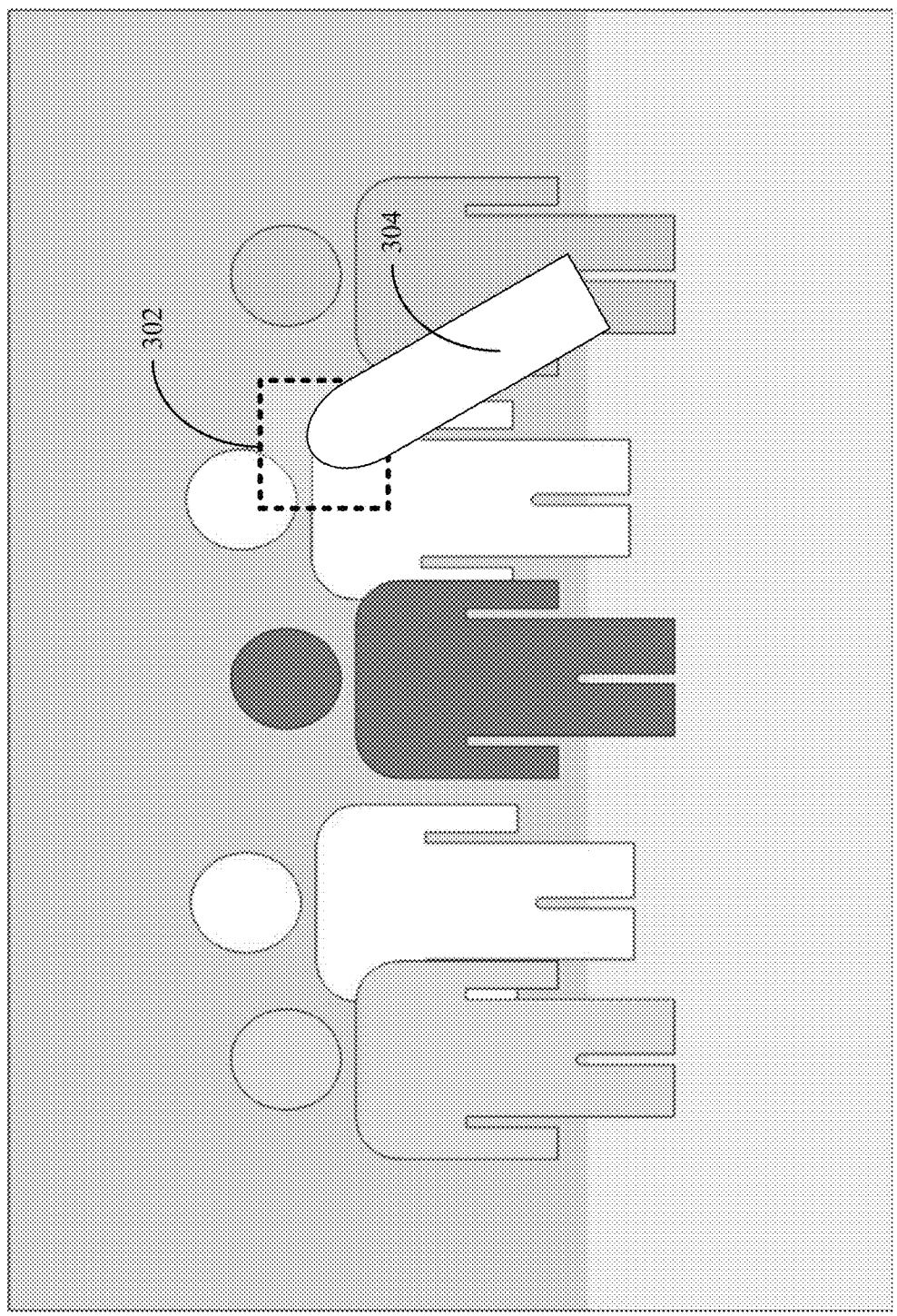
FIG. 3 illustrates the depiction of the example preview image in FIG. 1 with a region of interest (ROI) based on a user input.

FIG. 3 illustrates yet another depiction of the example preview image 100 with a ROI 302 based on a user input. A user input may include controlling a cursor, interacting with a touch sensitive display, shaking or moving the device, audible commands, detecting a gaze of a user and so on. A user input is not limited to a single action. For example, a user input may be single or multiple touches, gestures, audible commands, and so on. For the example preview image 100 in FIG. 3, a user's finger 304 may touch one or more portions of the preview image 100 displayed on a touch sensitive display. The user input, such as the user's touch, may then be used to determine a ROI 302.

A device may identify multiple faces in a preview image. However, only one face is typically selected and designated as a ROI. For example, a user may select the identified face to be used for the ROI, or the device may select the face closest to the center of the preview image. In this manner, only one face may affect measuring the brightness of the preview image for determining an exposure value.

In conventional HDR imaging, a device typically captures an overexposed image using a static (e.g., preset or preconfigured) number of stops greater than the stop used for capturing the LDR image called a reference image, and then captures an underexposed image using the same static number of stops less than the stop used for capturing the reference image. In this manner, the exposure value determined (which may be based in part on a ROI) is used to capture one reference LDR image, and an overexposed LDR image (with a range of brightness centered higher than the determined exposure value) and an underexposed LDR image (with a range of brightness centered lower than the determined exposure value) are captured.

One drawback of conventional HDR imaging is that the range of brightness of the resulting HDR image may not include all of the levels of brightness for a scene. For example, colors within one or more portions of a scene captured in the HDR image may be saturated (such as blacked out or whited out) if the brightness for the one or more portions of the scene are outside the range of brightness of the HDR image. This may be even more noticeable if there are multiple objects of interest, with the objects located in shaded areas and in bright light areas that are to be captured.

A further drawback of conventional HDR imaging is that only one ROI affects (e.g., is used to determine) the measured brightness for a preview image. For example, one identified face may be used to generate a ROI, while other faces in a preview image are ignored in determining an exposure value. If multiple objects of interest exist within a scene to be captured, it may be beneficial for multiple ROIs to be used for determining an exposure value(s) for HDR imaging.

Another drawback of conventional HDR imaging is that the ROI may skew the measured brightness for determining the exposure value for capturing an image, but the amount of skew may not be sufficient in determining an exposure value. For example, a person's face may be in shade (such as under a cap or umbrella) with the remainder of the scene brightly lit. As a result, the image captured using a determined exposure value may still include the face being too dark for a user's preference. For example, details of a person's face may be lost if a portion of the face is blacked out as the result of the exposure value being too low. Additionally, even if multiple ROIs are used to determine an exposure value, the determined exposure value may not be sufficient for each ROI if the brightness varies between the ROIs.

A further drawback of conventional HDR imaging is that the number of LDR images to be captured for HDR imaging is typically static, with a determined exposure value used to capture one LDR image, and a fixed number of LDR images being captured using exposure values that correspond to a fixed number of stops below and above the determined exposure value. As a result, the number of LDR images to be captured does not take into account the number of ROIs, much less the variations in brightness between the ROIs.

Another drawback of conventional HDR imaging is that a target brightness for a ROI is the same irrespective of the scene contents in the ROI. For example, a user may prefer some portions of a scene be darker (such as black fabrics or paints, darker skin tones, and so on) than other portions of a scene (lighter fabrics or paints, lighter skin tones, and so on). Treating the target brightness the same (e.g., in identical fashion) across ROIs irrespective of the scene contents may cause portions of a scene to appear too light or too dark in a resulting image. For example, if multiple faces or user indicated ROIs in different shadings appear in a scene, treating the target brightness the same for all ROIs may cause some regions in the resulting HDR image to appear too dark or too light as a result of the one target brightness used. Aspects of the present disclosure describe capturing a number of LDR images with different exposure values associated with different brightness. The number of LDR images corresponds to the number of ROIs. In this manner, each ROI is associated with its own target brightness for determining the exposure value for capturing one of the LDR images. Thus, in combining the LDR images, the resulting HDR image can be created so that no ROI is too dark or too light.

Aspects of the present disclosure describe systems and methods for determining exposure values to be used for HDR imaging. In determining exposure values, a device may determine the number of images to be captured for generating an HDR image, and the device may determine for each of the number of images the exposure value to be used in capturing the image. The number of images to be captured may be based on the number of ROIs in an image, in which the ROIs may be determined based on user input, facial recognition operation(s) performed on the scene for capture, a center portion (or region) of the preview image, some other aspects of a preview image, or a combination of any of the above. For example, a user may select one or more ROIs and/or facial recognition may be used to determine one or more ROIs, to generate a total number of ROIs to be used for generating an HDR image. In some example implementations, an LDR image is captured for a determined exposure value for each ROI in a preview image. Additionally, an LDR image may also be captured for a determined exposure value for the entire scene (which may be determined from the measured brightness for the entire preview image), and the captured LDR images are used in generating an HDR image. In some example implementations, a measured brightness may be determined exclusively from a ROI instead of skewing a measured brightness for the entire preview image. Additionally, the number of ROIs may increase or decrease as the LDR images are captured. For example, a person may enter the scene during capture, and a device may identify the face in a captured LDR image, determine a new ROI for the face, and capture a new LDR image based on the new ROI.

Figure 4:
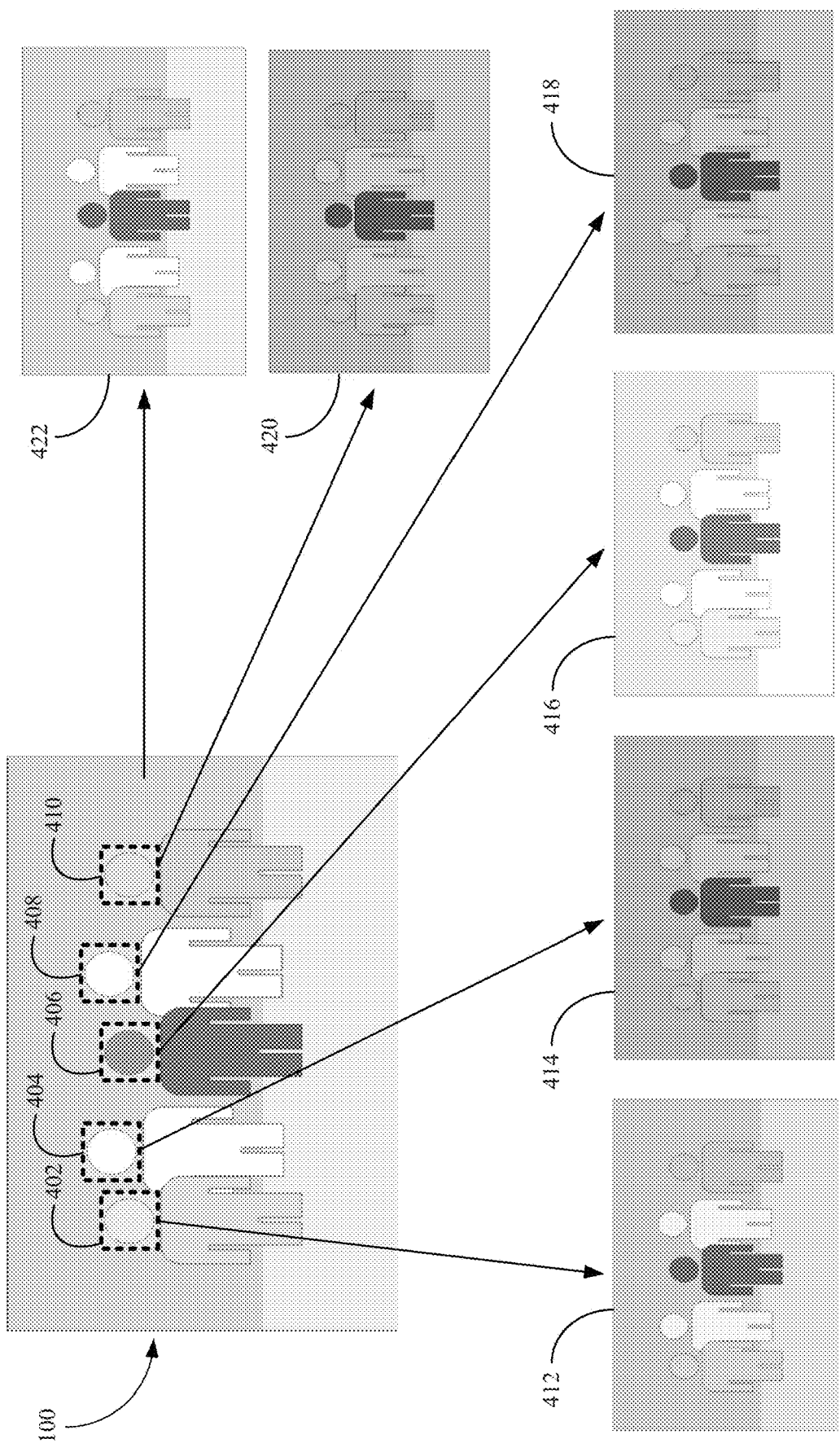
FIG. 4 is a depiction of an example preview image with multiple ROIs based on facial recognition.

FIG. 4 is a depiction of an example preview image 100 with multiple ROIs 402-410 based on facial recognition. An exposure value may be determined for each ROI 402-410, and an image 412-420 may be captured for each ROI 402-410, respectively. In some example implementations, an exposure value for the entire preview image 100 may be determined, and an image 422 captured using the determined exposure value. A device may then blend a set (e.g., all or a subset of all) of the captured images 412-420 (or images 412-422) to generate an HDR image. Additional ROIs may exist (not shown), such as based on a user input or other mechanisms to identify one or more ROIs. For example, a user may select multiple portions of the preview image to correspond with multiple ROIs. In some example implementations, at least one of the ROIs identified from a user input may be the same as at least one of the ROIs determined from the facial recognition operation. Additionally, or alternatively, a user input may be used to remove one or more ROIs. For example, facial recognition may be used to determine ROIs 402-410 in preview image 100 of FIG. 4. A user input may then be used to deselect ROI 408. In this manner, only images 412-416 and 420 (or images 412-416 and 420-422) are captured and are used as candidate images for a blending operation to generate an HDR image.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable electronic device (such as a security system with one or more cameras, smartphones, tablets, laptop computers, digital video and/or still cameras, web cameras, and so on) configured to or capable of capturing images or video. While described below with respect to a device having or coupled to one camera, aspects of the present disclosure are applicable to devices having any number of cameras (including no cameras, where a separate device is used for capturing images or video which are provided to the device), and are therefore not limited to devices having one camera. For example, different LDR images for HDR imaging may be captured by different camera sensors of a multiple camera module (such as a dual camera). Aspects of the present disclosure are applicable for capturing still images as well as for capturing video, and may be implemented in devices having or coupled to cameras of different capabilities (such as a video camera or a still image camera).

The term "device" is not limited to one or a specific number of physical objects (such as one smartphone, one camera controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects.

Figure 5:
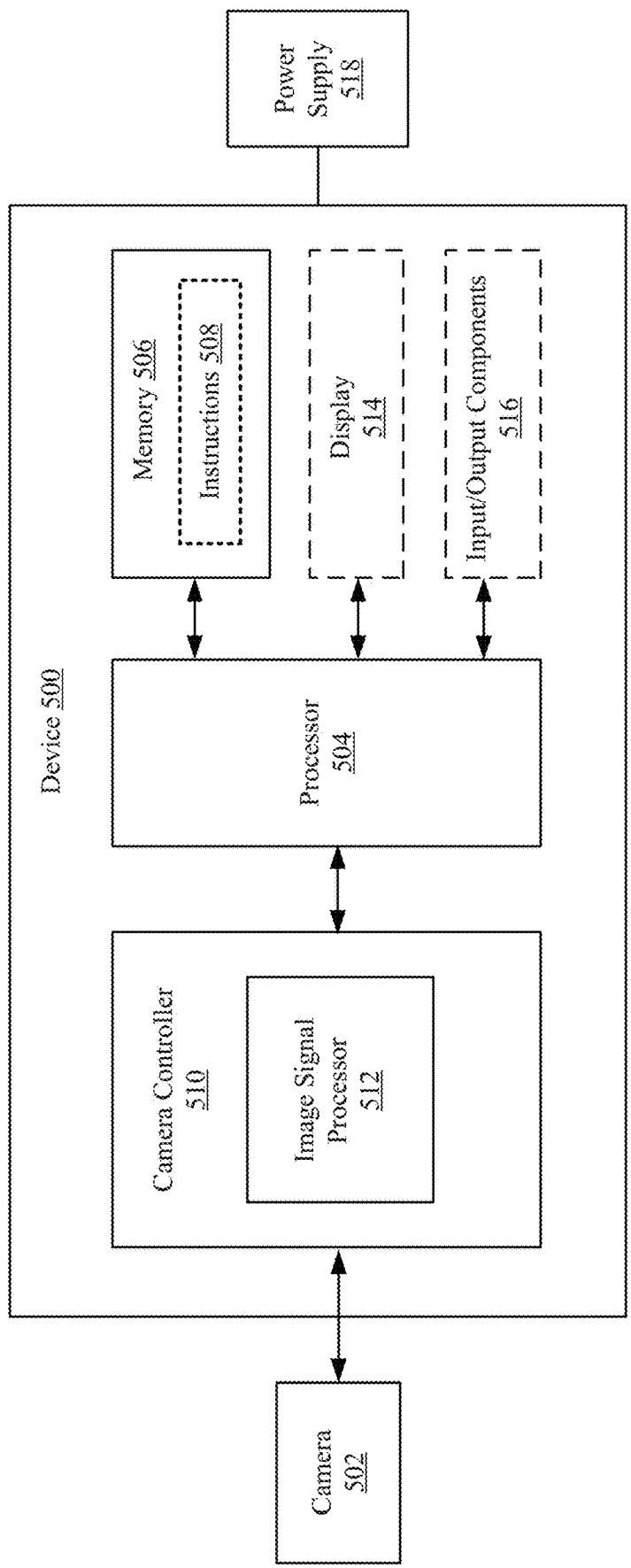
FIG. 5 is a block diagram of an example device for generating HDR images.

FIG. 5 is a block diagram of an example device 500 for generating HDR images. The example device 500 may include or be coupled to a camera 502, a processor 504, a memory 506 storing instructions 508, and a camera controller 510. The device 500 may optionally include (or be coupled to) a display 514 and a number of input/output (I/O) components 516. The device 500 may include additional features or components not shown. For example, a wireless interface, which may include a number of transceivers and a baseband processor, may be included for a wireless communication device. The device 500 may include or be coupled to additional cameras other than the camera 502. The disclosure should not be limited to any specific examples or illustrations, including the example device 500.

The camera 502 may be capable of capturing individual image frames (such as still images) and/or capturing video (such as a succession of captured image frames). The camera 502 may include a single camera sensor, or be a dual camera module or any other suitable module with multiple camera sensors, with one or more sensors being used for capturing images to be blended for HDR imaging. The memory 506 may be a non-transient or non-transitory computer readable medium storing computer-executable instructions 508 to perform all or a portion of one or more operations described in this disclosure. The device 500 may also include a power supply 518, which may be coupled to or integrated into the device 500.

The processor 504 may be one or more suitable processors capable of executing scripts or instructions of one or more software programs (such as instructions 508) stored within the memory 506. In some aspects, the processor 504 may be one or more general purpose processors that execute instructions 508 to cause the device 500 to perform any number of functions or operations. In additional or alternative aspects, the processor 504 may include integrated circuits or other hardware to perform functions or operations without the use of software. While shown to be coupled to each other via the processor 504 in the example of FIG. 5, the processor 504, the memory 506, the camera controller 510, the optional display 514, and the optional I/O components 516 may be coupled to one another in various arrangements. For example, the processor 504, the memory 506, the camera controller 510, the optional display 514, and/or the optional I/O components 516 may be coupled to each other via one or more local buses (not shown for simplicity).

The display 514 may be any suitable display or screen allowing for user interaction and/or to present items (such as captured images, video, or a preview image) for viewing by a user. In some aspects, the display 514 may be a touch-sensitive display. The I/O components 516 may be or include any suitable mechanism, interface, or device to receive input (such as commands) from the user and to provide output to the user. For example, the I/O components 516 may include (but are not limited to) a graphical user interface, keyboard, mouse, microphone and speakers, and so on. The display 514 and/or the I/O components 516 may provide a preview image to a user and/or receive a user input for adjusting one or more settings of the camera 502 (such as selecting and/or deselecting one or more ROIs of a displayed preview image).

The camera controller 510 may include an image signal processor 512, which may be one or more image signal processors to process captured image frames or video provided by the camera 502. In some example implementations, the camera controller 510 (such as the image signal processor 512) may also control operation of the camera 502. In some aspects, the image signal processor 512 may execute instructions from a memory (such as instructions 508 from the memory 506 or instructions stored in a separate memory coupled to the image signal processor 512) to process image frames or video captured by the camera 502. In other aspects, the image signal processor 512 may include specific hardware to process image frames or video captured by the camera 502. The image signal processor 512 may alternatively or additionally include a combination of specific hardware and the ability to execute software instructions. The image signal processor 512 may blend captured images to generate an HDR image. Additionally or alternatively, the processor 504 may blend captured images to generate an HDR image.

Conventional HDR imaging may not be sufficient for capturing some scenes with differences in brightness or light intensity, especially with multiple objects of interest. For example, as previously described, using one target brightness for capturing LDR images may cause some of the objects of interest in a resulting HDR image to appear too dark or too light. In some example implementations, multiple ROIs may be used in determining the number of images to be captured for blending into an HDR image. Additionally, a different ROI may be associated with each image to be captured, and the ROI may be used in determining an exposure value for capturing the image. As a result, multiple target brightness may exist, with a target brightness for determining an exposure value being specific to and/or based on exclusively on the portion of the preview in a ROI. In this manner, at least one of the LDR images shows an object of interest as neither too dark nor too light, and the LDR image can be used for the HDR image in order to show the object of interest in the HDR image as neither too dark nor too light.

Figure 6:
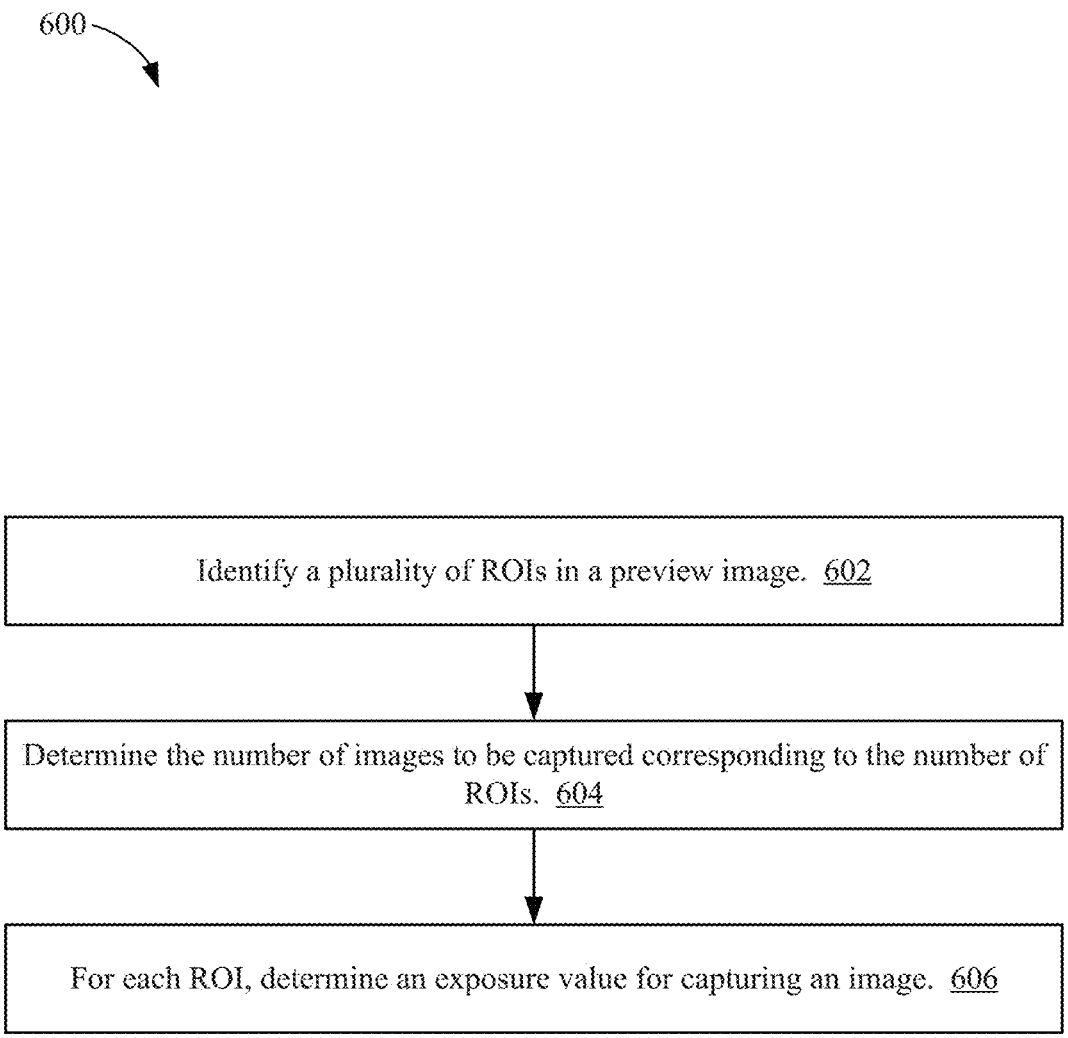
FIG. 6 is an illustrative flow chart depicting an example operation for determining exposure values to be used in capturing images for generating an HDR image.

FIG. 6 is an illustrative flow chart depicting an example operation 600 for determining exposure values to be used in capturing images for generating an HDR image (such as by combining the captured images). Although the example operation 600 (and other example operations) is described below with respect to the device 500 of FIG. 5, the example operation 600 (and other example operations) may be performed by other suitable devices or cameras. The device 500 may use an initial or default group of settings to capture and generate a preview image. For example, an initial exposure value (such as an initial shutter speed, camera sensor sensitivity, and/or aperture size), an initial focus setting, and so on may be used by camera 502 to capture a preview image, and an initial white balance setting, noise factor, and so on may be used by camera controller 510 to process and generate the preview image.

For generating an HDR image, the device 500 may identify a plurality of ROIs in a preview image (602). The device 500 may then determine the number of images to be captured as corresponding to the number of ROIs identified in the preview image (604). The device 500 may also determine an exposure value for each ROI (606). Each determined exposure value may be used in capturing a respective image. The captured images, each respectively corresponding to a ROI identified, selected, or otherwise determined based on the preview image serve as candidate images for use in generating an HDR image of the scene intended for capture. For example, at least two captured images may be blended to generate an HDR image.

Figure 7:
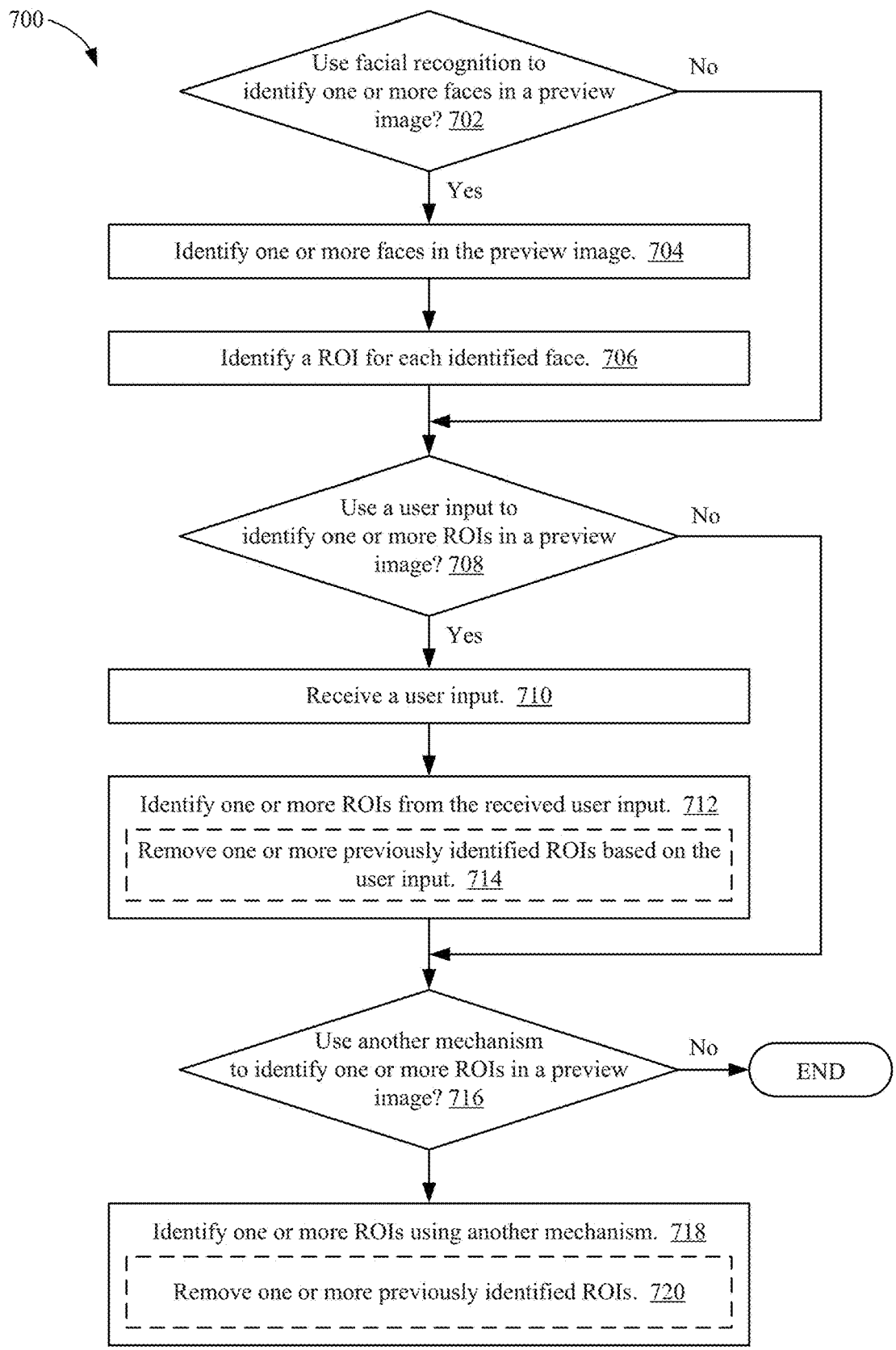
FIG. 7 is an illustrative flow chart depicting an example operation for identifying a plurality of ROIs in a preview image.

While the following examples illustrate some ways that a device may determine a plurality of ROIs, a device may identify a plurality of ROIs in different ways, and the disclosure should not be limited to any specific examples. FIG. 7 is an illustrative flow chart depicting an example operation 700 for identifying a plurality of ROIs in a preview image. Example operation 700 may be an example implementation of step 602 in example operation 600 (FIG. 6).

If facial recognition is to be used by the device 500 (702), the device 500 may identify one or more faces in the preview image (704). If facial recognition is not to be used by the device 500 (702), the process may skip to 708. Referring back to 704, facial recognition may be used to identify one or more faces in a preview image. The device 500 may then identify or determine a ROI for each identified face (706). For example, if the device 500 identifies four faces in a preview image, the device 500 may identify or determine four ROIs in the preview image. The ROI may be bounded by a box, ellipse, outline of the face, or other boundary. In some example implementations, the device 500 sizes the ROI so that the ROI is as small as possible without cutting off a portion of the identified face. In some other example implementations, the ROI may be a static size, or the size of the ROI may depend on the distance of the face from the camera. The boundary for a ROI may be the same type (such as a rectangle, box, ellipse, and so on) for all ROIs. Alternatively, the boundary may differ between ROIs. For example, the boundary may depend on a type of object in the ROI, or the device 500 may use an edge detection or outline process to generate a ROI.

If a user input is not to be used in identifying one or more ROIs in a preview image (708), the process proceeds to 716. For example, if only facial recognition is to be used in identifying a plurality of ROIs, the device 500 does not perform steps 710-714 regarding identifying one or more ROIs from a user input. Further, if the device 500 is able to use a user input to identify one or more ROIs but does not receive a user input, the device 500 does not perform steps 710-714.

If the device 500 is to use a user input to identify one or more ROIs (708), the device 500 may receive the user input (710). The device 500 may then determine one or more ROIs from the user input (712). In some example implementations, the device 500 may display a preview image on a touch sensitive display 514. A user may then touch one or more portions of the displayed preview image to indicate different locations or objects of interest in the preview image. In one example, a user may touch an area of the preview image that is too dark or washed out to indicate that a ROI should be in that area of the preview image. As a result, the device 500 may use the ROI indicated by the user input in determining an exposure value for capturing an image to obtain more detail for the objects in the dark or washed out area of the preview image. In another example, a user may touch a face of a person in the preview image that was not identified by facial recognition. In another example, a user may identify objects of particular interest by touching the objects in the preview image. For example, if a picture to be captured includes a family pet, a user may indicate a ROI should correspond to the family pet by touching the pet in the preview image.

In some example implementations, the device 500 may optionally use the user input to remove one or more previously identified ROIs (714). In one example, a user may identify that only a subset of the identified faces from facial recognition are to be used for identifying ROIs. For example, the preview image may indicate the ROIs or faces identified based on facial recognition. The user may then touch one or more of the identified ROIs or faces to deselect or remove them from being used. Referring back to FIG. 4, if the device 500 identifies five ROIs 402-410 based on facial recognition, a user may select one or more of the ROIs 402-410 to exclude the selected one or more ROIs from being used in generating a HDR image. In another example, if multiple ROIs are identified by the device 500, a user may draw or size a boundary (such as a box, rectangle, line, curve, and so on) to select a subset of the ROIs within or outside the boundary. The device 500 may then "ignore" (i.e., not utilize) the unselected ROIs in determining the number of images to be captured for purposes of generating the HDR image.

Another user input may include one or more audio cues from the user. In one example, the device 500 may use facial recognition to determine who is in the scene. For example, the user may have labelled an identified person in previous pictures (such as by entering his or her name), and the device 500 may recognize the same person in the scene and associate the identified person with a ROI. The user may then state, e.g., to "exclude [person's name]." In response to the user's audible input, the device 500 may "ignore" or exclude the ROI for capturing the LDR images. Additionally or alternatively, the user may state to exclude all people/faces, set the number of people/faces to include, include other objects (such as animals, cars, and so on), and so on. Likewise, the user may state, e.g., to "include [person's name]" in order to instruct/control the device 500 to capture an LDR image associated with that particular ROI (e.g., the identified person) determined to be present within that scene for capture.

A further user input may include haptic feedback from a user (other than a user touching a display or interacting with a GUI). In one example, a user may squeeze, twist, shake, move, press a physical button of, or otherwise interact with the device 500 to exclude the last identified ROI or to identify a portion of the preview as a ROI. For example, the user may intend another ROI be defined by squeezing, twisting, or shaking the device 500. The device 500 may then define a new generic ROI that can be moved (and sized) based on device 500 movements or other user inputs to the device 500.

Another user input may include at where in a preview a user looks, gazes, glances, or peers. For example, a camera or light sensor oriented toward the user may be used to determine at where the user is looking in the preview to determine that the area should include a ROI. If the device 500 detects that the user looks at the area of the preview for a threshold amount of time, the device 50 creates a new ROI for the area of the preview.

While some example user inputs are provided, other user inputs may exist, and the present disclosure should not be limited to the provided examples.

While facial recognition and user inputs are provided as examples for identifying a plurality of ROIs, the device 500 may use other means in identifying one or more ROIs. Referring back to FIG. 7, the device 500 determines if one or more ROIs are to be identified using another mechanism (other than facial recognition or a user input) (716). If no other mechanism is to be used in identifying one or more ROIs (716), the device 500 does not perform 718 or 720, and the process ends. If another mechanism is to be used in identifying one or more ROIs (716), the device 500 identifies one or more ROIs using the other mechanism(s) (718). Optionally, the device 500 may use the other mechanisms to exclude one or more identified ROIs for capturing the plurality of LDR images. In one example mechanism, the device 500 may determine that portions of the preview image include saturated colors (such as portions of the preview image being blacked out or whited out) and determine ROIs for those portions to prevent the HDR image from including regions with saturated or washed out colors. In this manner, the device 500 may create a ROI for each region with saturated colors. In another example mechanism, the device 500 may determine a change in measured brightness greater than a threshold between neighboring regions or pixels of the preview image. The change in measured brightness may indicate different areas of brightness (such as shaded spots and well-lit spots in the scene). The device 500 may create a ROI for each region with a difference in measured brightness greater than a threshold from neighboring areas' measured brightness. For example, the device 500 may use a fill algorithm based on measured pixel brightness to identify and grow ROIs for determining exposure values.

In a further example mechanism, the device 500 may use object recognition to identify one or more ROIs. In some example implementations, a family pet (such as a dog or cat) may be identified through object recognition by the device 500. For example, a user may have labelled a dog or cat identified in previous images, and the device 500 may identify and determine the same dog or cat in the current scene. The device 500 may therefore identify a new ROI for the dog or cat. In an example of combining user input and object recognition for identifying ROIs, the user may also state to exclude the dog or cat, and the device 500 may exclude the ROI created for the dog or cat.

In another example mechanism, the device 500 may determine proximity between ROIs to determine if one or more identified ROIs are to be excluded. In some example implementations, if one ROI associated with a face or object is a pixel distance away from the cluster of the remaining ROIs that is greater than a threshold, the device 500 may determine that the ROI associated with the face is to be excluded. Similarly, if the size of the face is significantly smaller than the other faces, the device 500 may determine that the depth of the face from the other faces in the scene is greater than a threshold so that an ROI associated with the face is excluded. For example, a scene may include a plurality of people in the background, but the people/faces of interest in the image are bunched together for the device 500 to capture the image. The device 500 may determine that the people of interest are bunched together within a specific distance, or the faces of the people are within a range of sizes of pixels in the preview, in order to identify which faces or people to include for ROIs. In this manner, faces or people in the background may be excluded from ROIs.

In a further example mechanism, a depth map may be used to determine a difference in depths for the portions of the scene associated with identified ROIs. The device 500 may, e.g., determine to exclude one or more ROIs if the people or faces corresponding to the ROIs are outside a range of depth from the people or faces corresponding to the other ROIs.

In another example, the device 500 may determine that the target brightness for two or more of the ROIs is the same. In this manner, the device 500 may determine to capture only LDR image for the ROIs with the same target brightness (to conserve processing resources as the multiple preview images may be the same).

While some example mechanisms for identifying or excluding identified ROIs have been provided, other example mechanisms for identifying (or excluding) one or more ROIs may exist, and the present disclosure should not be limited by any of the mentioned example mechanisms.

In addition or alternative to a device 500 excluding one or more identified ROIs before capturing the LDR images (such as described above regarding steps 714 and 720 of FIG. 7), the device 500 may capture one or more LDR images for each of the identified ROIs. The device 500 may then determine which LDR images to use for combining into the HDR image. In this manner, the user may indicate or the device 500 may otherwise determine that one or more ROIs are not of importance for creating the HDR image (and therefore one or more LDR images should be excluded). In one example, the device 500 may preview the LDR images for the different ROIs, and the user may select which LDR images to use for HDR imaging. In another example, the device may perform any of the identification mechanisms as described above to determine which associated LDR images are to be excluded from the HDR imaging.

While the above examples describe identifying a plurality of ROIs in a preview image, in some example implementations, the ROIs may be identified across a plurality of images. For example, the device 500 may display a preview stream on the display 514. With the device 500 displaying a succession of preview images, the user input may be across a plurality of preview images such that a ROI is identified in a first preview image, another ROI is identified in a second preview image, and so on. In another example, one or more additional ROIs may be identified in images being captured for blending during HDR imaging. A person may enter the scene while the images are being captured using the determined exposure values for previously identified ROIs, and the device 500 may identify an additional face using facial recognition. In this manner, the device 500 may identify a new ROI corresponding to the new face, and determine an exposure value for the new ROI in order to capture an additional image. Since a preview image may be one image or a stream of images, and also is not limited to a preview, identifying a plurality of ROIs in a preview image includes identifying a plurality of ROIs across a plurality of images, which may include preview images and other captured images.

With the ROIs identified by the device 500, the device 500 may determine the number of images to be captured and blended for HDR imaging. In some example implementations, the number of images to be captured equals the number of identified ROIs in the preview image. Referring back to FIG. 4, if the device 500 identifies five ROIs 402-410, the device 500 may determine to capture five images 412-420 for blending during HDR imaging. In some other example implementations, the number of images to be captured is at least the number of identified ROIs. For example, the device 500 may capture an image 422 for an exposure value determined for the entire preview image 100. In this manner, the number of images to be captured equals the number of ROIs plus one. In another example, the device 500 may determine to capture a plurality of images for each ROI. The device 500 may use a determined exposure value for a ROI to also capture an underexposed image and an overexposed image for the exposure value, so that the number of images to be captured is a multiple of the number of ROIs identified in the preview image. The number of images to be captured may also be a multiple of the number of identified ROIs plus one (with one image captured using an exposure value determined for the entire preview image). Other example implementations for determining the number of images to be captured for HDR imaging may exist, and the present disclosure should not be limited by any of the provided examples.

In addition to identifying the number of images to be captured, the device 500 may determine an exposure value for each of the images to be captured. In some example implementations, the device 500 determines an exposure value for each identified ROI. Additionally, the device 500 may optionally determine an exposure value for the entire preview image. The exposure value for the entire preview image may be the same as the exposure value used in capturing the preview image. Alternatively, the exposure value for the entire preview image may be an exposure value such that the overall, average, or median measured brightness for an entire captured image equals a target brightness.

In some example implementations, the device 500 may determine an exposure value by recursively adjusting an exposure value and capturing an image until the measured brightness equals the target brightness for the ROI. For example, the device 500 may average the measured brightness for the pixels in the ROI, and compare the average against a target brightness. The device 500 then adjusts the exposure value until the average brightness in the ROI equals the target brightness.

There may exist a correlation between a change in exposure value and a change in measured brightness. For example, a change in exposure value may be linearly correlated to a change in measured brightness. If the correlation between a change in measured brightness and a change in the exposure value is known, the device 500 may use the correlation, a target brightness, and the measured brightness to determine the exposure value. The device 500 may store a look-up table or other data structure (such as a group of instructions for executing an algorithm) including the correlation that may be used to determine an exposure value from an input of a measured brightness for an initial exposure value (such as the exposure value used to capture the preview image) and a target brightness. The look-up table or data structure may be stored in memory 506, or may be stored in a memory coupled to the image signal processor 512.

If determining a measured brightness for an entire image, a difference in brightness between images may correlate to a difference in exposure values for capturing the images. For example, a darker image may correspond to a faster shutter speed, smaller aperture size, and/or reduced camera sensor sensitivity. In some aspects, if a target brightness is used in adjusting an exposure value before capturing an image, a linear correlation between a difference in a measured brightness and the target brightness and a difference in the corresponding initial exposure value (for an initial measured brightness for the preview image) and adjusted exposure value (for the measured brightness equaling the target brightness in the to be captured image) may be expressed in equation (1) below:

$$\frac{|\text{Adjusted Exposure Value} - \text{Initial Exposure Value}|}{|\text{Target Brightness} - \text{Initial Measured Brightness}|} = X \quad (1)$$

where X is a real number. When a linear correlation exists, a difference in exposure values for capturing any two images divided by the difference in corresponding brightness for the two images may equal X. Thus, expanding equation (1) to differences in exposure value in general may be expressed in equation (2) below:

$$\frac{|\text{Exposure Value 1} - \text{Exposure Value 2}|}{|\text{Brightness}(\text{Exposure Value 1}) - \text{Brightness}(\text{Exposure Value 2})|} = X \quad (2)$$

where X is a real number, Exposure Value 1 is a first exposure value, Exposure Value 2 is a second exposure value, Brightness(Exposure Value 1) is a brightness corresponding to an image for a first exposure value, and Brightness(Exposure Value 2) is a brightness corresponding to an image for a second exposure value. For example, Exposure Value 1 may be an initial exposure value for capturing a preview image and Brightness(Exposure Value 1) may be the corresponding measured brightness of the preview image. Exposure Value 2 may be an adjusted exposure value for the image to be captured and Brightness(Exposure Value 2) may be the corresponding measured brightness of the image to be captured using the adjusted exposure value.

In some example implementations for determining an exposure value for an identified ROI, the measured brightness inside the ROI may skew the measured brightness for the image outside the ROI. For example, a weighted average may be used to apply a larger weight to brightness for pixels in the ROI than a weight applied to brightness for pixels outside the ROI. In this manner, if the measured brightness of the ROI is used to skew the measured brightness in the same way for both a preview image and the image to be captured (such as the same weights being used for corresponding pixels between the images in a weighted average), the correlation expressed in equations 1 and 2 may still be used in determining an exposure value for an image to be captured.

In some other example implementations for determining an exposure value for an identified ROI, only the portion of the preview image corresponding to the ROI and the portion of the image to be captured corresponding to the ROI are used in measuring brightness for the two images, respectively. In this manner, the portion of the preview image outside the ROI and the portion of the image to be captured outside the ROI are disregarded when determining a measured brightness for each image. The correlation expressed in equations 1 and 2 may be used, where the brightness is measured only across the ROI in the preview image and the target brightness is exclusively for the portion of the image to be captured corresponding to the ROI.

For example, equation (2) can be reordered as expressed in equation (3) below:

Exposure Value 2=Exposure Value 1+X*(Brightness (Exposure Value 2)−Brightness(Exposure Value 1)) (3)

If Exposure Value 1, Brightness(Exposure Value 1), Brightness(Exposure Value 2), and linear correlation value X are known, Exposure Value 2 may be determined without using a recursive process of adjusting the exposure value and measuring and comparing the brightness. If Exposure Value 2 is the exposure value to be determined for the ROI, Exposure Value 1 may be the exposure value used in capturing the preview image, Brightness(Exposure Value 1) may be the measured brightness for the ROI in the preview image, Brightness(Exposure Value 2) may be the target brightness for portion of the image to be captured corresponding to the ROI, and correlation value X may be a predetermined value stored by the device 500.

The device 500 may therefore determine an exposure value for each ROI. The device 500 may also optionally determine an exposure value for the entire preview image, if capturing an image additional to the number of images corresponding to the number of ROIs.

In some example implementations for determining an exposure value for each ROI, the target brightness may be the same for each ROI. For example, if brightness is measured for each pixel on a luma scale from 0 to 255, the device 500 may use a target brightness value of n, where n is to equal the average of the luma values for the pixels in the ROI for the image captured using the determined exposure value for the ROI. In this example, n is bounded by 0 and 255, and the same value n is used for each and every ROI of the preview image. The target brightness may be automatically determined by the device 500. For example, the device 500 may use a predefined target brightness for specific scene types (such as nighttime, action shots, landscape, portrait, indoors, outdoors, and so on). A user may select the scene type or the device 500 may automatically attempt to determine the scene type. Additionally or alternatively, a user may select the target brightness to be used. In another example, a predefined target brightness may be used for all ROIs irrespective of the scene type.

In some other example implementations, the target brightness may differ between ROIs in the preview image. For example, a user may select a different target brightness for one or more ROIs in the preview image. Additionally or alternatively, a target brightness may be based on the contents of the ROI in the preview image. For example, if the contents are dark or blacked out, the device 500 may use a higher target brightness than used for another ROI to attempt to obtain more detail for the contents in a captured image. Similarly, if the contents are light or whited out, the device 500 may use a lower target brightness than used for another ROI to attempt to obtain more detail for the contents in a captured image.

If one or more ROIs include or are based on a face (such as if facial recognition is used to identify one or more ROIs based on identified faces), the target brightness for an ROI may be based on a skin tone of the identified face. Lighter skin tones may correspond to a higher measured brightness for the corresponding pixels in an image than darker skin tones. As a result, the device 500 may use a higher target brightness for lighter skin tones than for darker skin tones. In this manner, the target brightness may differ across ROIs including faces of different skin tones.

FIG. 8 is an illustrative flow chart depicting an example operation 800 for determining a target brightness for a ROI based on a skin tone. The device 500 may first measure a brightness for the ROI in the preview image (802). For example, the device 500 may determine an average brightness for the ROI. The ROI may include information other than a face, such as hair, part of a shirt, background, and so on. In some example implementations, the device 500 may optionally disregard portions of the ROI not including the face (804). For example, a fill algorithm may be used to identify neighboring pixels having similar color values. In this manner, the pixels including facial information are used in measuring the brightness. Alternatively, the entire ROI may be used in measuring a brightness.

The device 500 may then use the measured brightness to determine a skin tone for the face (806). Lighting in a scene may alter the appearance of skin tone in a preview image. For example, bright lights in a scene may cause skin tones to appear lighter while shade may cause skin tones to appear darker in a preview image. The device 500 may therefore optionally compensate for lighting differences in the scene that may alter the appearance of skin tones in a preview image (808).

In compensating, if a change in exposure value is correlated to a change in measured brightness, the change in the measured brightness for a face may also be correlated to a change in exposure value. In one example, the measured brightness for the face compared to the measured brightness for the image may be used to determine a skin tone. In another example, if large variations of lighting exist in the scene, the measured brightness for the face compared to the measured brightness for the portion of the image around the face may be used to determine a skin tone. The portion of the image around the face may be, e.g., the ROI, a portion of the image a determined number of pixels from the face, a user defined portion of the image, a portion of the image corresponding to a portion of the scene with similar lighting and including the face, and so on.

In some example implementations, the device 500 may store different measured brightness of faces for different skin tones. For example, the device 500 may store a range of measured brightness of faces for the range of different skin tones. In one example of compensating for lighting differences, the range of measured brightness may correspond to a predefined brightness for a preview image (or the region of the preview image around the face). In this manner, if the measured brightness for the preview image (or region) is different than the predefined brightness, the device 500 may adjust the measured brightness for the face. For example, if brightness is measured on a luma scale of 0 to 255, the target brightness corresponding to the range of skin tones is 100, and the measured brightness for the preview image (or the region) is 80, the device 500 may increase the measured brightness for the face by 20.

Having determined the measured brightness (or compensated brightness) for the face, the device 500 may compare the brightness for the face to one or more brightness corresponding to one or more skin tones. If a range of brightness is correlated to a range of skin tones, the brightness corresponding to the darkest skin tone may be a minimum for the range of brightness for the different skin tones. Similarly, the brightness corresponding to the lightest skin tone may be a maximum for the range of brightness for the different skin tones.

The minimum for the range of brightness may be a minimum ratio of the brightness scale, with the ratio corresponding to the darkest skin tone. In some example implementations, the minimum ratio may be 45 percent of the maximum of the brightness scale (such as 45 percent of the brightness value for a white pixel). For example, if a luma scale for the preview image is 0 to 255, the minimum may be 45 percent of 255, which is approximately 114 or 115. The maximum for the range of brightness may be a maximum ratio of the brightness scale, with the ratio corresponding to the lightest skin tone. In some example implementations, the maximum ratio may be 70 percent of the maximum of the brightness scale (such as 70 percent of the brightness value for a white pixel). In the example of the luma scale being 0 to 255, the maximum may be 70 percent of 255, which is approximately 178 or 179. In this example, the range of brightness corresponding to the range of skin tones may be 114 to 179. While 45 percent and 70 percent are provided as an example minimum and maximum for a range of brightness, any suitable values or percentages may be used, and the present disclosure should not be limited to a specific example. In some example implementations, if the measure brightness is outside the range, the device 500 may use a predefined target brightness. In some other example implementations, the device 500 may adjust the measured brightness to be the minimum or the maximum of the range if the measured brightness is respectively below or above the range. In some further example implementations, the device 500 may remove the ROI so that the ROI is not used for HDR imaging.

The range of measured brightness may also correspond to a range of target brightness, and a change in measured brightness (corresponding to skin tone) may be linearly correlated to a change in target brightness. In one example, for a luma scale of 255, the minimum target brightness corresponding to the minimum measured brightness (the lightest skin tone) may be 36, and the maximum target brightness corresponding to the maximum measured brightness (the darkest skin tone) may be 80. In this example, if the measure brightness is the minimum measured brightness of 114 for a face, the device 500 may determine the target brightness for the ROI to be 36. Similarly, if the measured brightness is the maximum measured brightness of 179 for a face, the device 500 may determine the target brightness for the ROI to be 80. While 36 and 80 are provided as one example of boundaries for a range of target brightness, any suitable boundaries may be used, and the present disclosure should not be limited to a specific example. For example, the minimum may be 30, 35, 40, and so on, and the maximum may be 70, 75, 85, 95, 100, and so on.

If a range of measured brightness (regarding a range of skin tones) is linearly correlated to a range of target brightness, the device 500 may determine an interpolation factor in order to determine the target brightness for the ROI (810). The interpolation factor may indicate the offset from the boundaries of the range of target brightness that corresponds to the measured (or compensated) brightness for the face. An example interpolation factor is expressed in equation (4) below:

$$\text{Interpolation Factor } (IF) = \frac{\left(\frac{\text{brightness for face}}{\text{maximum brightness}}\right) - \text{minimum ratio}}{\text{maximum ratio} - \text{minimum ratio}} \quad (4)$$

In this manner, if the maximum brightness is 255 (for a luma scale of 0 to 255), the minimum ratio is 45 percent, and the maximum ratio is 70 percent, the interpolation factor may be expressed in equation (5) below:

$$IF = \frac{\left(\frac{\text{brightness for face}}{255}\right) - .45}{.25} \quad (5)$$

If the brightness for the face in the ROI is measured (or compensated) as 150 (from the luma scale of 0 to 255), the device 500 may determine the interpolation factor to be ((150/255)−0.45)/0.25, which approximately equals 0.553. The example interpolation factor indicates that the skin tone is a medium skin tone approximately halfway between the darkest skin tone and the lightest skin tone in the range of skin tones.

In some other example implementations for determining a skin tone, the device 500 may use different ranges of measured brightness for each of a number of different skin tones. For example, a dark skin tone may correspond to a first range of measured brightness, a medium skin tone may correspond to a second range of measured brightness higher than the first range, and a light skin tone may correspond to a third range of measured brightness higher than the second range. In one example of ranges, the first range may be 30 percent to 50 percent of the luma scale, the second range may be 50 percent to 65 percent of the luma scale, and the third range may be 65 percent to 80 percent of the luma scale. The above example is provided only for illustrative purposes, and any suitable number of skin tones may be used, the ranges may overlap or be mutually exclusive, and the ranges may be the same size, differ in size, and be centered at any suitable location along the range of brightness. The present disclosure should not be limited to a specific example for determining the skin tone.

After determining the skin tone for a face in the ROI, the device 500 may determine a target brightness for the determined skin tone (812). The target brightness may then be used by the device 500 in determining the exposure value for the ROI. If the determined skin tone is a location in a range of skin tones, an interpolation factor may indicate the location of a skin tone in a range of skin tones, which may correspond to a location of a target brightness in a range of target brightness. Alternatively, if the determined skin tone is one of a number of skin tones corresponding to different ranges of measured brightness, a different target brightness may be assigned to each of the number of skin tones.

If the device 500 determines an interpolation factor (810), the device 500 may use the interpolation factor to determine the target brightness (814). With the range of target brightness including a minimum target brightness and a maximum target brightness, an example target brightness determined from an interpolation factor is expressed in equation (6) below:

Target Brightness=minimum target brightness*(1−IF)+maximum target brightness*IF (6)

Continuing the previous examples in determining an interpolation factor, if the minimum target brightness is 36, the maximum target brightness is 80, and the interpolation factor is 0.553, the device 500 may determine the target brightness according to equation (6) to be 36*(1-0.553)+ 80*0.553, which approximately equals 60. Similar to the example interpolation factor indicating that the skin tone is a medium skin tone approximately halfway between the darkest skin tone and the lightest skin tone in the range of skin tones, the target brightness (60) is approximately halfway between the minimum target brightness (36) and the maximum target brightness (80) in the range of target brightness.

After determining the target brightness for each of the ROI, and determining an exposure value for each of the determined target brightness, the device 500 may use the determined exposure values to capture the plurality of images. For example, referring back to FIG. 4, the device 500 may determine a target brightness for each ROI 402-410 based on skin tone, determine an exposure value for each ROI 402-410 based on the determined target brightness and the measured brightness for the ROI and the exposure value used in capturing the preview image 100, and use camera 502 to capture the plurality of images 412-420 using the determined exposure values for ROIs 402-410. The device 500 may also determine an exposure value for the entire preview image 100, and capture image 422 to be blended with images 412-420.

In some example implementations, the portion of the HDR image corresponding to a ROI in the preview image may come from the image captured using the determined exposure value for the ROI. In this manner, the portion of each captured image corresponding to the respective ROI is used in generating the HDR image. In some example implementations, the image captured using the exposure value determined for the entire preview image may be used for the portions of the HDR image not corresponding to any ROI in the preview image. However, the device 500 may use any suitable process for blending multiple images for HDR imaging, and the present disclosure should not be limited to a specific example for generating an HDR image from multiple captured images.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 506 in the example device 500 of FIG. 5) comprising instructions 508 that, when executed by the processor 504 (or the camera controller 510 or the image signal processor 512), cause the device 500 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 504 or the image signal processor 512 in the example device 500 of FIG. 5. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. For example, while the term "blending" or "blend" is used to describe aspects of the present disclosure, images may be otherwise combined, merged, or fused. Images (such as LDR images) can be used in any suitable way for generating an HDR image, and the present disclosure should not be limited to the provided examples. Additionally, the functions, steps or actions of the method claims in accordance with aspects described herein need not be performed in any particular order unless expressly stated otherwise. For example, the steps of the described example operations, if performed by the device 500, the camera controller 510, the processor 504, and/or the image signal processor 512, may be performed in any order and at any frequency (such as for every HDR image or when requested by a user (such as placing the device 500 in a special HDR imaging mode)). Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method for high-dynamic range (HDR) imaging, comprising:
    identifying one or more faces in a preview image;
    identifying a region of interest (ROI) for each identified face of the one or more faces in the preview image, wherein a number of identified ROIs is more than one;
    determining a number of images to be captured for an HDR image to be the number of identified ROIs; and
    for each ROI corresponding to an identified face of the one or more faces:
        determining a skin tone of the identified face;
        determining, based on the determined skin tone and a comparison between the identified face and the ROI corresponding to the identified face, a target brightness of the respective image associated with the ROI; and
        determining, based on the target brightness, an exposure value of the respective image associated with the ROI.

2. The method of claim 1, wherein determining the exposure value of a respective image associated with a ROI comprises exclusively using the ROI in determining the exposure value.

3. The method of claim 2, further comprising:
    determining a separate exposure value from an entirety of the preview image, wherein the exposure value is to be used for capturing an image other than the number of images;
    receiving the number of images and the image other than the number of images captured using corresponding exposure values; and
    generating the HDR image based on the number of images and the image other than the number of images.

4. The method of claim 1, further comprising:
    receiving a user input for the preview image; and
    identifying one or more ROIs of the preview image from the user input.

5. The method of claim 1, further comprising for each ROI corresponding to an identified face of the one or more faces:
    comparing a size of the identified face to a size of the ROI corresponding to the identified face.

6. A device configured to generate a High-Dynamic Range (HDR) image, comprising:
    one or more processors implemented in circuitry; and
    a memory coupled to the one or more processors and including instructions that, when executed by the one or more processors, cause the device to:
        identify one or more faces in a preview image;
        identify a region of interest (ROI) for each identified face of the one or more faces in the preview image, wherein a number of identified ROIs is more than one;
        determine a number of images to be captured for an HDR image to be the number of identified ROIs; and
        for each ROI corresponding to an identified face of the one or more faces:
            determine a skin tone of the identified face;
            determine, based on the determined skin tone and a comparison between the identified face and the ROI corresponding to the identified face, a target brightness of the respective image associated with the ROI; and
            determine, based on the target brightness, an exposure value of the respective image associated with the ROI.

7. The device of claim 6, wherein execution of the instructions further causes the device to exclusively use the ROI in determining the exposure value.

8. The device of claim 7, wherein execution of the instructions further causes the device to:
    determine a separate exposure value from an entirety of the preview image, wherein the exposure value is to be used for capturing an image other than the number of images;
    receive the number of images and the image other than the number of images captured using corresponding exposure values; and
    generate the HDR image based on the number of images and the image other than the number of images.

9. The device of claim 8, further comprising one or more cameras, wherein execution of the instructions further causes the device to:
- capture the preview image using at least one camera of the one or more cameras; and
- capture the number of images and the image other than the number of images using at least one camera of the one or more cameras.

10. The device of claim 6, further comprising:
- a display to display the preview image; and
- a user interface to receive a user input for the displayed preview image;
- wherein execution of the instructions further causes the device to identify one or more ROIs of the preview image from the user input.

11. The device of claim 6, wherein execution of the instructions, for each ROI corresponding to an identified face of the one or more faces, further causes the device to:
- compare a size of the identified face to a size of the ROI corresponding to the identified face.

12. A non-transitory computer-readable medium storing one or more programs containing instructions that, when executed by one or more processors of a device, cause the device to:
- identify one or more faces in a preview image;
- identify a region of interest (ROI) for each identified face of the one or more faces in the preview image, wherein a number of ROIs is more than one;
- determine a number of images to be captured for an HDR image to be the number of identified ROIs; and
- for each ROI corresponding to an identified face of the one or more faces:
  - determine a skin tone of the identified face;
  - determine, based on the determined skin tone and a comparison between the identified face and the ROI corresponding to the identified face, a target brightness of the respective image associated with the ROI; and
  - determine, based on the target brightness, an exposure value of the respective image associated with the ROI.

13. The non-transitory computer-readable medium of claim 12, wherein execution of the instructions further causes the device to exclusively use the ROI of the preview image in determining the exposure value.

14. The non-transitory computer-readable medium of claim 13, wherein execution of the instructions further causes the device to:
- determine a separate exposure value from an entirety of the preview image, wherein the exposure value is to be used for capturing an image other than the number of images;
- receive the number of images and the image other than the number of images captured using corresponding exposure values; and
- generate the HDR image based on the number of images and the image other than the number of images.

15. The non-transitory computer-readable medium of claim 12, wherein execution of the instructions further causes the device to:
- receive a user input for the preview image; and
- identify one or more ROIs of the preview image from the user input.

16. The non-transitory computer-readable medium of claim 12, wherein execution of the instructions further causes the device to:
- for each ROI corresponding to an identified face of the one or more faces, compare a size of the identified face to a size of the ROI corresponding to the identified face.

* * * * *